US00RE49981E

(19) United States
(12) Reissued Patent
Williams et al.

(10) Patent Number: US RE49,981 E
(45) Date of Reissued Patent: May 21, 2024

(54) NETWORK ORCHESTRATION

(71) Applicant: Metaswitch Networks Ltd., Enfield (GB)

(72) Inventors: Matthew Williams, Enfield (GB); Michael Evans, Enfield (GB); Jonathan Lawn, Enfield (GB); Calum Loudon, Enfield (GB); Diarmid Mackenzie, Enfield (GB)

(73) Assignee: Metaswitch Networks Ltd., Enfield (GB)

(21) Appl. No.: 17/566,679

(22) Filed: Dec. 30, 2021

Related U.S. Patent Documents

Reissue of:
(64) Patent No.: 10,523,503
Issued: Dec. 31, 2019
Appl. No.: 15/485,056
Filed: Apr. 11, 2017

(30) Foreign Application Priority Data

Nov. 10, 2016 (GB) ..... 1619013.4

(51) Int. Cl.

| | |
|---|---|
| ***H04L 12/24*** | (2006.01) |
| ***G06F 9/50*** | (2006.01) |
| ***G06F 11/00*** | (2006.01) |
| ***H04L 12/46*** | (2006.01) |
| ***H04L 41/0806*** | (2022.01) |

(Continued)

(52) U.S. Cl.
CPC ..... *H04L 41/0806* (2013.01); *G06F 9/5077* (2013.01); *G06F 11/008* (2013.01); *H04L 12/4641* (2013.01); *H04L 41/12* (2013.01); *H04L 41/145* (2013.01);

(Continued)

(58) Field of Classification Search
CPC ..... H04L 41/0806; H04L 41/145; H04L 12/4641; H04L 41/40; H04L 41/12; H04L 41/044; G06F 9/5077; G06F 11/008; G06F 2209/501; Y02D 10/00
See application file for complete search history.

(56) References Cited

U.S. PATENT DOCUMENTS 8,108,855 B2 * 1/2012 Dias ..... G06F 9/5077 717/176
10,187,260 B1 * 1/2019 Chen ..... H04L 41/145
(Continued)

*Primary Examiner* — Woo H Choi
*Assistant Examiner* — Cameron Saadat
(74) *Attorney, Agent, or Firm* — Han Gim; Newport IP, LLC

(57) ABSTRACT

Measures, including methods, apparatuses and non-transitory computer-readable storage media, associated with network orchestration. A model of a physical resources part of a network and a model of a virtualised resources part of the network are obtained. The physical/virtualised resources part of the network includes a plurality of physical resources/at least one virtualised network function and represents dependencies between different physical/virtualised resources in the physical/virtualised resources part of the network. At least one optimisation operation is performed using the models of the physical and virtualised resources parts of the network to identify an optimised mapping of the at least one virtualised network function onto at least one of the plurality of physical resources. The at least one virtualised network function is instantiated on the at least one of the plurality of physical resources based on the identified optimised mapping.

23 Claims, 6 Drawing Sheets

(51) Int. Cl.
*H04L 41/12* (2022.01)
*H04L 41/14* (2022.01)
*H04L 41/044* (2022.01)

(52) U.S. Cl.
CPC ..... *G06F 2209/501* (2013.01); *H04L 41/044* (2013.01); *Y02D 10/00* (2018.01)

(56) References Cited

U.S. PATENT DOCUMENTS

| | | | | |
|---|---|---|---|---|
| 2003/0172150 | A1 | 9/2003 | Kennedy | |
| 2003/0177176 | A1 | 9/2003 | Hirschfeld et al. | |
| 2005/0138625 | A1 | 6/2005 | Carroll et al. | |
| 2007/0220522 | A1* | 9/2007 | Coene | G06F 9/5066 718/104 |
| 2012/0215912 | A1 | 8/2012 | Houlihan et al. | |
| 2012/0233607 | A1 | 9/2012 | Kuroda et al. | |
| 2013/0042003 | A1* | 2/2013 | Franco | H04L 67/1097 709/226 |
| 2013/0226525 | A1 | 8/2013 | Marwah et al. | |
| 2014/0165054 | A1 | 6/2014 | Wang et al. | |
| 2014/0223007 | A1* | 8/2014 | Jorgenson | H04L 41/12 709/224 |
| 2014/0325036 | A1 | 10/2014 | Jahanbanifar et al. | |
| 2014/0344462 | A1* | 11/2014 | Pabari | G06F 9/5072 709/226 |
| 2015/0347194 | A1 | 12/2015 | Che et al. | |
| 2016/0105350 | A1* | 4/2016 | Greifeneder | H04L 41/046 709/224 |
| 2017/0091010 | A1* | 3/2017 | Takahashi | G06F 11/079 |

* cited by examiner

NETWORK ORCHESTRATION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This [application] *is a reissue of U.S. Pat. No. 10,523,503, issued Dec. 31, 2019, filed as U.S. patent application Ser. No. 15/485,056, filed Apr. 11, 2017, which* claims priority under 35 U.S.C. § 119(a) to UK patent application no. GB1619013.4, filed on Nov. 10, 2016, the entire [content] *contents* of *each* which [is] *are* hereby incorporated by reference.

BACKGROUND OF THE INVENTION

Field of the Invention

The present disclosure relates to network orchestration. In particular, the present disclosure relates to methods, apparatuses, non-transitory computer-readable storage media associated with network orchestration.

Description of the Related Technology

A network system may be represented using a model such as a reliability block diagram (RBD). An RBD, also known as a dependence diagram (DD), is a directed acyclic graph in which each node describes a component of the network system and each edge indicates a dependency. The network system model may be used, for example, to determine availability in the network system or to calculate a probability of failure of network system components.

SUMMARY

According to embodiments of the present disclosure, there is provided a method of network orchestration, the method comprising, by an orchestrator:

obtaining a model of a physical resources part of a network, the physical resources part of the network comprising a plurality of physical resources, the model of the physical resources part of the network representing dependencies between different physical resources in the physical resources part of the network;

obtaining a model of a virtualized resources part of the network, the virtualized resources part of the network comprising at least one virtualized network function, the model of the virtualized resources part of the network representing dependencies between different virtualized resources in the virtualized resources part of the network;

performing at least one optimization operation using the model of the physical resources part of the network and the model of the virtualized resources part of the network to identify an optimized mapping of the at least one virtualized network function onto at least one of the plurality of physical resources; and instantiating the at least one virtualized network function on the at least one of the plurality of physical resources based on the identified optimized mapping.

According to embodiments of the present disclosure, there is provided apparatus configured to be used in network orchestration, the apparatus comprising at least one memory including computer program code and at least one processor in data communication with the at least one memory, wherein the at least one processor is configured to:

obtain a model of a physical resources part of a network, the physical resources part of the network comprising a plurality of physical resources, the model of the physical resources part of the network representing dependencies between different physical resources in the physical resources part of the network;

obtain a model of a virtualized resources part of the network, the virtualized resources part of the network comprising at least one virtualized network function, the model of the virtualized resources part of the network representing dependencies between different virtualized resources in the virtualized resources part of the network;

perform at least one optimization operation using the model of the physical resources part of the network and the virtualized resources part of the network to identify an optimized mapping of the at least one virtualized network function onto at least one of the plurality of physical resources; and instantiate the at least one virtualized network function on the at least one of the plurality of physical resources based on the identified optimized mapping.

According to embodiments of the present disclosure, there is provided a non-transitory computer-readable storage medium comprising computer-executable instructions which, when executed by a processor, cause a computing device to perform a method of network orchestration, the method comprising, by an orchestrator:

obtaining a model of a physical resources part of a network, the physical resources part of the network comprising a plurality of physical resources, the model of the physical resources part of the network representing dependencies between different physical resources in the physical resources part of the network;

obtaining a model of a virtualized resources part of the network, the virtualized resources part of the network comprising at least one virtualized network function, the model of the virtualized resources part of the network representing dependencies between different virtualized resources in the virtualized resources part of the network;

performing at least one optimization operation using the model of the physical resources part of the network and the model of the virtualized resources part of the network to identify an optimized mapping of the at least one virtualized network function onto at least one of the plurality of physical resources; and instantiating the at least one virtualized network function on the at least one of the plurality of physical resources based on the identified optimized mapping.

Further features of the present disclosure will become apparent from the following description of embodiments, given by way of example only, which is made with reference to the accompanying drawings.

DETAILED DESCRIPTION OF CERTAIN INVENTIVE EMBODIMENTS

Figure 1:
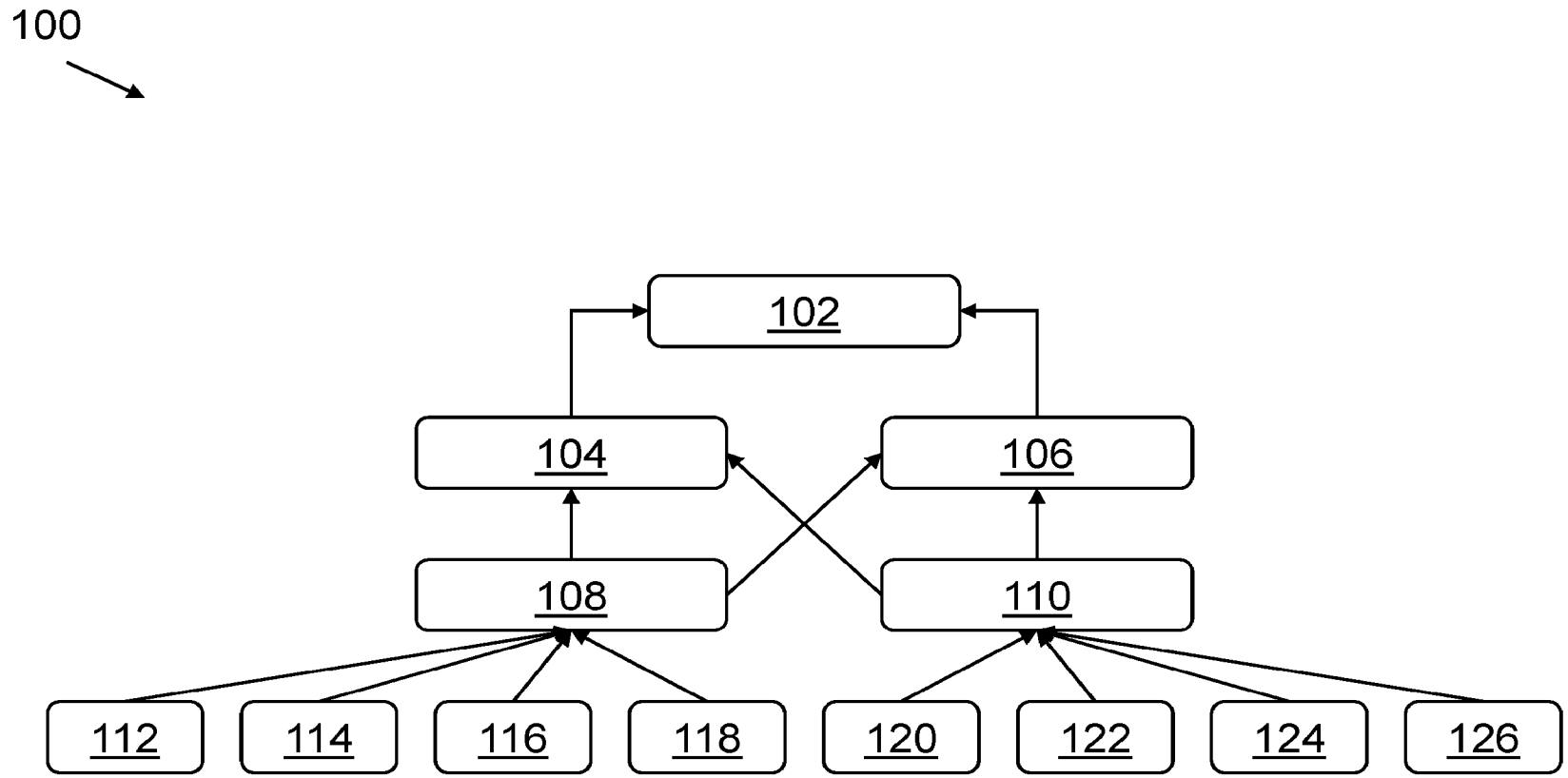
FIG. 1 shows a schematic diagram of an example model of at least a part of a network.

Referring to FIG. 1, there is shown schematically an example of a model 100 of at least a part of a network. The network may comprise one or more other entities not depicted in FIG. 1. In this example, the model 100 is in the form of an RBD.

The model 100 depicted in FIG. 1 is of a physical resources part of the network. The physical resources part of the network may, for example, be referred to as a hardware part, a hardware components part, a hardware resources part and/or a physical network elements part. The physical resource part of the network comprises a plurality of physical resources. The physical resources may, for example, be referred to as hardware, hardware components, hardware resources and/or physical network elements. Physical resources in the physical resources part of the network may comprise one or more power feeds, one or more power supplies, one or more servers, one or more central processing units, or more air-conditioning supplies, one or more network routers, one or more network switches, one or more network cables, Random Access Memory (RAM) and/or magnetic storage (for example one or more disks). The physical resources part of the network may alternatively or additionally comprise one or more other types of physical resource. The physical resources part of the network may be situated in a data center. Physical resources in the physical resources part of the network may be co-located or may be located at multiple different geographic locations. The physical resources may be owned by one entity or may be owned by multiple entities. Some or all of the physical resources may be located on-site at the premises of a service provider. Some or all of the physical resources may be located off-site, for example they may be physical resources providing cloud-based services.

In this example, the physical resource part of the network comprises a power feed 102. In this example, the physical resource part of the network comprises a single power feed, namely the power feed 102. A network may however comprise multiple power feeds, for example to provide redundancy in the event of one power feed failing. In this example, the power feed 102 does not depend on any other physical resources in the network.

In this example, the physical resources part of the network comprises two power supplies, namely first and second power supplies 104, 106. In this example, the first and second power supplies 104, 106 are both dependent on the power feed 102. Each of the first and second power supplies 104, 106 is available as long as the power feed 102 is available and the power supply itself has not failed.

In this example, the physical resource part of the network comprises two servers, namely first and second servers 108, 110. In this example, the first server 108 is dependent on both the first and second power supplies 104, 106. The second server 110 is also dependent on both the first and second power supplies 104, 106. In this example, each of the first and second servers 108, 110 is available as long as at least one of the first and second power supplies 104, 106 is available and the server itself has not failed. As such, in this example, both of the first and second power supplies 104, 106 do not need to be available for the first and second servers 108, 110 to operate; this provides power supply redundancy. In other examples, both of the first and second power supplies 104, 106 may need to be available for the first and second servers 108, 110 to operate. The first and second servers 108, 110 may be in the same rack as each other. The first and second servers 108, 110 may be in the same rack as the first and second power supplies 104, 106.

In this example, the physical resource part of the network comprises eight central processing units (CPUs), namely first through fourth CPUs 112, 114, 116, 118 and fifth through eighth CPUs 120, 122, 124, 126. The first through fourth CPUs 112, 114. 116, 118 are dependent on the first server 108. The fifth through eighth CPUs 120, 122, 124, 126 are dependent on the second server 110. Each of the first through fourth CPUs 112, 114, 116, 118 is available as long as the first server 108 is available and the CPU itself has not failed. Each of the fifth through eighth CPUs 120, 122, 124, 126 is available as long as the second server 110 is available and the CPU itself has not failed. In this example, the first through fourth CPUs 112, 114, 116, 118 are components of the first server 108 and the fifth through eighth CPUs 120, 122, 124, 126 are components of the second server 110.

Some or all of the physical resources in the network may have associated performance data. The performance data may indicate one or more values of one or more performance-related variables associated with the one or more physical resources with which it is associated. Examples of such variables include, but are not limited to, availability, capacity, power consumption, operating cost, capital cost, cooling requirement, a measure of time between failures and/or a measure of time to recover. The measure of time between failures may be a mean time between failures (MTBF). The measure of time to recover may be a mean time to recover (MTTR). The availability of a given physical resource 102 may be calculated as: MTBF/(MTBF+MTTR).

While the model 100 depicted in FIG. 1 is a relatively straightforward model of a physical resources part of a network, more complex models may have more complex rules concerning the number of dependencies required for a dependent node to be available. For example, a server could require two out of three power supplies on which it is dependent to be available, rather than one out of two as in this example. In another example, a server could require both at least one power supply and one air-conditioning supply (not shown) to be available. Data associated with the model may comprise an indication of the number of dependencies a resource needs to be available.

Figure 2:
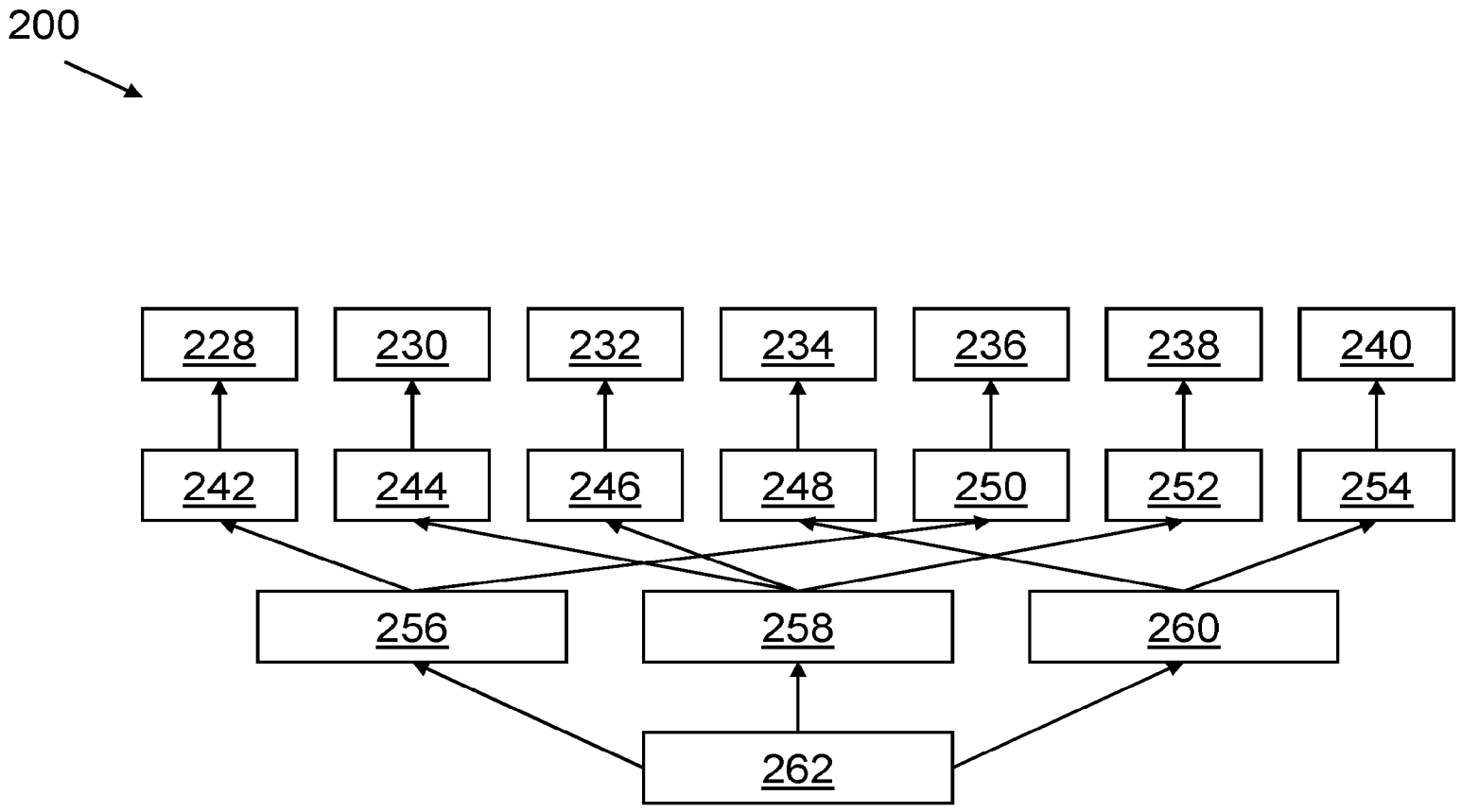
FIG. 2 shows a schematic diagram of a model of another example of at least a part of a network.

Referring to FIG. 2, there is shown schematically an example of a model 200 of at least a part of a network. The network may comprise one or more other entities not depicted in FIG. 2. In this example, the model is in the form of an RBD.

The model 200 depicted in FIG. 2 is of a virtualized resources part of the network. The virtualized resources part of the network may, for example, be referred to as a virtualized part, a virtual part, a virtual resources part, a virtualized network function (VNF) resources part. The virtualized resources part of the network comprises at least one virtualized resource. The at least one virtualized resource in the virtualized resources part of the network may comprise one or more containers, one or more virtual machines (VMs), one or more VNFs, one or more virtualization network function components (VNFCs) and/or one or more virtualization network function instances (VNFIs). A container is similar to a VM, but in general a large number of containers run on a single CPU relative to the number of VMs that run on a single CPU. The virtualized resources part of the network may comprise one or more other types of virtualized resource.

The model 200 may represent, for example, a network in accordance with the Project Clearwater™ architecture (http://www.projectclearwater.org/), which provides a cloud-based Internet Protocol (IP) Multimedia Subsystem (IMS). The virtualized resources may, for example, correspond to Homestead™ (Home Subscriber Server (HSS) mirror), Sprout™ (Session Initiation protocol (SIP) router) and Perimeta® (Session Border Controller (SBC)) elements.

In this example, the virtualized resource part of the network comprises seven VMs 228, 230, 232, 234, 236, 238, 240. One or more of the VMs 228, 230, 232, 234, 236, 238, 240 may provide the same or similar functionality as one or more other of the VMs 228, 230, 232, 234, 236, 238, 240. For example, the first VM 228 may provide the same or similar functionality as the fifth VM 236.

In this example, the virtualized resource part of the network comprises seven VNFIs 242, 244, 246, 248, 250, 252, 254. Each of the VNFIs 242, 244, 246, 248, 250, 252, 254 is dependent on a respective VM 228, 230, 232, 234, 236, 238, 240. Each of the VNFIs 242, 244, 246, 248, 250, 252, 254 is available as long as the VM 228, 230, 232, 234, 236, 238, 240 on which it is dependent is available and the VNFI is also available. One or more of the VNFIs 242, 244, 246, 248, 250, 252, 254 may provide the same or similar functionality as one or more other of the VNFIs 242, 244, 246, 248, 250, 252, 254. For example, the first VNFI 242 may provide the same or similar functionality as the fifth VNFI 250.

In this example, the virtualized resource part of the network comprises three VNFCs 256, 258, 260. The first VNFC 256 is dependent on the first and fifth VNFIs 242, 250. As described above, the first and fifth VNFIs 242, 250 may provide the same or similar functionality as each other. The first VNFC 256 may, in some examples, still be able to function if at least one of the first and fifth VNFIs 242, 250 is available, thereby proving a degree of redundancy. The second VNFC 258 is dependent on the second, third and sixth VNFIs 244, 246, 252. The third VNFC 260 is dependent on the fourth and seventh VNFIs 248, 254.

In this example, the virtualized resource part of the network comprises a VNF 262. An example of a VNF is a telephony service. The VNF 262 is dependent on the first, second and third VNFCs 256, 258, 260. Although a single VNF 262 is shown in this example, the virtualized resource part of the network may comprise more than one VNF.

Some or all of the virtualized resources in the network may have associated performance data.

The model 200 may be approximated from a VNF description in the Topology and Orchestration Specification for Cloud Applications (TOSCA) format. Additional annotations may be used to provide a more complete representation of a network than that in a TOSCA-format VNF description. For example, an annotation may comprise performance data associated with some or all of the virtualized resources. The annotation may be provided, for example, as extensions within a TOSCA file, or as a separate file.

In examples described herein, a network (for example a computer network) is modelled (for example using one or more RBDs) so that a measure of performance (for example availability) can be determined for one or more components of the network and/or the network as a whole. In contrast to known systems, examples described herein model virtualization (or 'virtualized resources') in addition to physical resources. Examples described herein take into account that VNFs can be allocated to different physical resources and that performance within the network can be dependent on how the VNFs are so allocated. Examples described herein relate further to network optimization using a hybrid model of the network, where the hybrid model comprises both a virtualized resources part and physical resources part, based on a mapping of the virtualized resources part onto the physical resources part. The mapping may specify or define an interrelationship between the virtualized resources part and the physical resources part of the network.

In examples described herein, a decision is made on the one or more physical resources on which VNFs should be instantiated (or 'located', 'run' or 'allocated'). When making this decision, an objective may be to maximize availability in the event of a failure in the network, for example in the physical resources part of the network. Various different techniques may be used to model the performance (for example availability) of a complex system, such as a computer network. One such technique involves use of one or more RBDs.

Service providers may have one or more RBDs that model their physical resources and VNF vendors may have one or more RBDs that model their VNFs. By composing (or 'combining' or 'merging') these, hitherto separate, RBDs, different mappings of VNFs to physical resources may be tested, simulated and/or implemented. A mapping which gives a desired performance, for example a maximum performance (for example availability) across all possible mappings, may then be used to configure the network according to the corresponding mapping.

Figure 3:
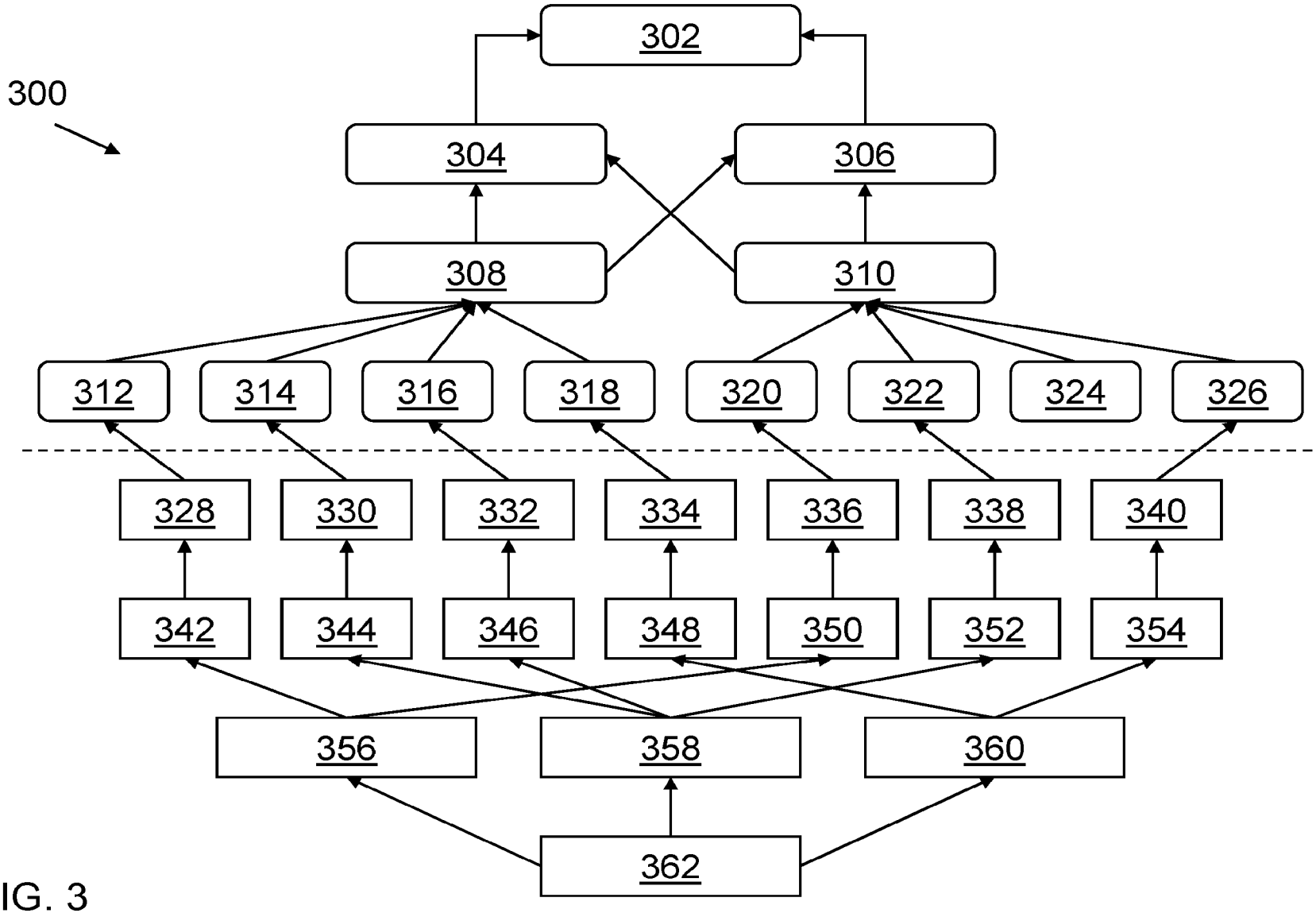
FIG. 3 shows a schematic diagram of an example of a model of a network in accordance with embodiments.

Referring to FIG. 3, there is shown schematically an example of a model 300 of a network. In this example, the model is in the form of an RBD. In this example, the model 300 is a hybrid model of the network, in the form of a single model modelling both a physical resources part and a virtualized resources part of the network.

In this example, a model of a physical resources part of a network is obtained. Obtaining the model may comprise receiving or generating the model. In this example, the model of the physical resources part of the network is the RBD 100 shown in FIG. 1. The model of the physical resources part of the network may comprise or may be accompanied by performance data related to the physical resources part of the network. The performance data may relate to performance (for example availability) of some or all of the physical resources.

In this example, a model of the virtualized resources part of the network is also obtained. Obtaining the model may comprise receiving or generating the model. In this example, the model of the virtualized resources part of the network is the model 200 shown in FIG. 2.

In this example, the model of the physical resources part of the network and the model of the virtual resources part of the network are combinable (or 'composable' or 'integrable') such that the separate models can be used to create a single, combined model. Compared to using arbitrarily selected model types, combining two, non-arbitrary, models of the same or a compatible format can facilitate such combining. In some examples, combining multiple models comprises converting at least one of the models into a preferred format, for example for compatibility with one or more other of the models.

The separate physical resources and virtualized resources models are therefore combined into a single model of the network which represents a dependency of the virtualized resources part of the network on the physical resources part of the network. In some examples, multiple models of sub-regions of the virtual resources part of the network are combined to form a combined model of the virtual resources part of the network. Each of the multiple sub-region models may, for example, relate to VNFs from different VNF vendors. In some examples, the combined model of the virtual resources part of the network is then combined with a model of the physical resources part of the network to generate a combined model of the network identifying both physical resources and virtualized resources in the network.

A mapping of at least one VNF in the virtualized resources part of the network onto at least one of the plurality of physical resources in the physical resources part of the network is identified. As such, the mapping maps at least one VNF to one or more physical resources.

In the example model 300 depicted in FIG. 3, nodes with rounded corners represent physical resources and nodes with square corners represent VNF resources. The mapping is illustrated by the tier of edges in a mapping layer between the nodes with rounded and square corners. The mapping layer is indicated in FIG. 3 by a horizontal broken line. The model 300 represents the virtualized resources part of the network using at least one hierarchical level (in this example, four hierarchical levels are used) and represents the physical resources part of the network using at least one additional hierarchical level (in this example. four additional hierarchical levels are used).

In this example, the first through sixth VMs 328, 330, 332, 334, 336, 338 are mapped onto the first through sixth CPUs 312, 314, 316, 318, 320, 322 respectively and the seventh VM 340 is mapped onto the eighth CPU 326. In this example, no VM is mapped onto the seventh CPU 324. As such, the VNF 362 is not dependent on the seventh CPU 324. The seventh CPU 324 may be reserved for future expansions, upgrades or the like.

The mapping may be a one-to-one mapping, which maps one virtualized resource to only one physical resource. The mapping may be a one-to-many mapping, which maps one virtualized resource to multiple physical resources. The mapping may be a many-to-one mapping, which maps multiple virtualized resources to only one physical resource. The mapping may be a many-to-many mapping, which maps multiple virtualized resources to multiple physical resources. Various different considerations may be taken into account when determining a mapping type. For example, it may be preferred not to map multiple virtualized resources to only one physical resource where such mapping would place an undesirably high burden on the physical resource.

In this example, the VNF 362 is mapped onto at least one of the plurality of physical resources via at least one intermediate virtualized network entity.

As such, in this example, the network can be represented using an availability and/or dependency model taking into account both physical and virtualized resources. In practice, physical resources are unlikely to have 100% availability. Since virtualized resources also have less than 100% availability, they may fail of their own accord, as well as because the physical resources that underlie them fail. An availability model can help to manage the fact that physical resources and/or virtual resources can fail.

One or more actions may be performed once a mapping has been determined or identified. An example of such an action is displaying the mapping to an administrator. Another example of an action is implementing the mapping. Implementing the mapping may be automatic in that it does not require administrator input to confirm that a selected mapping is acceptable or may involve manual confirmation, for example by an administrator, that a selected mapping is acceptable. As such, the VNF 362 may be instantiated on the one or more physical resources onto which it is mapped based on the identified mapping.

In some examples, implementing a given mapping does not involve any changes to physical resources. For example, implementing a mapping may involve changes in the mapping layer but no changes or reconfiguration in the physical resources in the physical resources part of the network. As such, in contrast to some known network planning or configuration techniques which relate to configuration of physical resources in a network, examples described herein are not concerned with configuration of physical resources themselves. Instead, examples described herein are concerned with the mapping between virtualized resources and physical resources.

One or more performance metrics, for example availability, may be calculated for the network based on the combined model.

At least one optimization operation may be performed. For example, the mapping may be optimized to give the highest possible availability. As such, given a physical resource model, one or more VNF models and a mapping, the overall availability may be calculated efficiently, for example using known algorithms. As such, the model 300 models at least one variable associated with at least one VNF and/or at least one variable associated with some or all of the plurality of physical resources. The at least one variable may comprise availability, capacity, power consumption, operating cost, capital cost, cooling requirement, time between failures and/or time to recover.

The mapping can be optimized using at least one discrete optimization algorithm. Using such discrete optimization algorithms may include using genetic algorithms and/or using simulated annealing.

In some examples, a first performance metric associated with a first mapping is determined. The first mapping is selected based on a comparison of the first performance metric with a first reference metric. The first performance metric and the first reference metric may for example relate to availability, capacity, power consumption, operating cost, capital cost, cooling requirement, time between failures and/or time to recover.

The first reference metric may indicate a threshold percentage availability value. The threshold percentage availability value may be set by a service provider. The first mapping may be selected on the basis that the first performance metric associated with the first mapping exceeds the threshold percentage availability value. This may be the case even if another mapping could have a higher percentage availability value than that associated with the first mapping. In such examples, an acceptable solution may be identified, which trades off time, resources and complexity to identify the solution against acceptability of the solution. The threshold percentage availability value may be a percentage availability value associated with a currently used mapping so that a mapping that improves on the currently used mapping is selected.

In some examples, a second performance metric associated with the first mapping is determined. The selecting of the first mapping may be based further on a comparison of the second performance metric with the second reference metric. The second performance metric and the second reference metric may for example relate to availability, capacity, power consumption, operating cost, capital cost, cooling requirement, time between failures and/or time to recover.

The second performance metric may be used as a constraint in selecting the first mapping. For example, the first performance metric may relate to operating cost and the second performance metric may relate to availability. An example of a constrained (or 'composite') assessment of the first mapping may involve seeking to minimize operating cost while maintaining a minimum acceptable level of availability. Another example of a constrained assessment of the first mapping involves seeking to minimize the number of physical resources used, while seeking to maintain cooling costs below a threshold level.

Multiple constraints may be used in selecting the first mapping. For example, physical space, cooling requirements and cost may all be constraints in selecting the first mapping. Optimization may be performed for multiple metrics. Weightings may be applied to some or all of the metrics. For example, optimized availability and cost may be weighted more heavily than physical space. Some of the constraints and optimizations may be over overlapping metrics.

Figure 4:
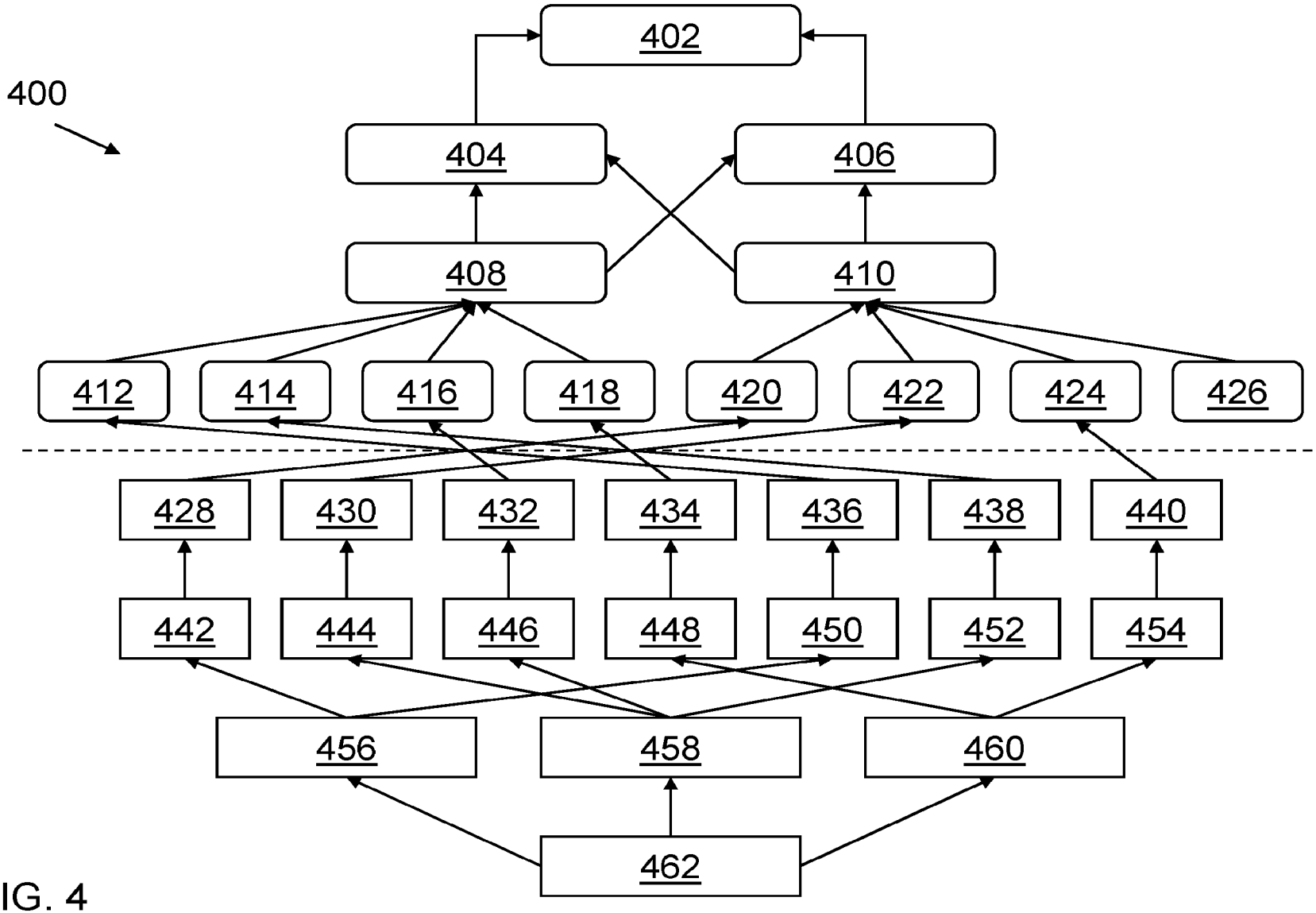
FIG. 4 shows a schematic diagram of another example of a model of a network in accordance with embodiments.

Referring to FIG. 4, there is shown schematically an example of a model 400 of a network. In this example, the model is in the form of an RBD.

In this example, a second different, mapping maps a VNF onto some or all of a plurality of physical resources. The second mapping is different from the first mapping.

In this example, the first VM 428 is mapped onto the fifth CPU 420 (whereas it was mapped onto the first CPU 312 in the model 300), the second VM 430 is mapped onto the sixth CPU 422 (whereas it was mapped onto the second CPU 314 in the model 300), the fifth VM 436 is mapped onto the first CPU 412 (whereas it was mapped onto the fifth CPU 320 in the model 300), the sixth VM 438 is mapped onto the second CPU 414 (whereas it was mapped onto the sixth CPU 422 in the model 300), and the seventh VM 440 is mapped onto the seventh CPU 424 (whereas it was mapped onto the eighth CPU 326 in the model 300). The third and fourth VMs 432, 434 are still mapped onto the third and fourth CPUs 416, 418 respectively as they were in the first mapping. No VM is mapped onto the eighth CPU 426 in this example.

In this example, a number of the edges in the mapping layer are therefore different from those shown in the model 300 depicted in FIG. 3.

In some examples, multiple different mappings are used. For example, mappings may be changed in a cyclic manner. The mappings may be changed deterministically or substantially non-deterministically. Different mappings and network configurations may be tested and simulated until a preferred mapping is identified. The network may then be configured based on the preferred mapping.

A performance metric associated with the second mapping may be determined. The first reference metric (against which the first performance metric associated with the first mapping is compared) may be the performance metric associated with the second mapping. As such, the first mapping may be objectively compared to the second mapping, so that a preferred mapping may be selected and used.

As such, a preferred one or more of a plurality of hardware components of a network on which to instantiate one or more VNFs can be determined based at least in part on a dependency model representing at least a dependency of one or more VNFs on some or all of the plurality of hardware components.

The network orchestration methods described herein may be performed during network planning and/or during simulation of operation of the network. As such, one or more network configurations may be tested or simulated before the configuration is implemented. This may provide an efficient mechanism for network orchestration and configuration in that a preferred configuration may be identified before the network is activated. This may, for example, facilitate providing an acceptable level of service.

The network orchestration methods described herein may be performed prior to adding one or more additional physical resources and/or virtualized resources and/or services to the network. As such, an impact of the addition may be assessed in advance. This may facilitate reducing a disruption to service as a result of the addition. An optimized configuration may also be determined taking into account the addition.

The network orchestration methods described herein may be performed prior to modifying one or more additional physical resources and/or virtualized resources and/or services in the network. As such, an impact of the modification may be assessed in advance. This may facilitate reducing a disruption to service as a result of the modification.

The network orchestration methods described herein may be performed prior to removing one or more additional physical resources and/or virtualized resources and/or services from the network. As such, an impact of the removal may be assessed in advance. This may facilitate reducing a disruption to service as a result of the removal.

The network orchestration methods described herein may be performed in response to adding one or more additional physical resources and/or virtualized resources and/or services to the network. As such, an impact of the addition may be assessed, for example immediately after the addition. An optimized configuration may also be determined taking into action the addition.

The network orchestration methods described herein may be performed in response to failure of one or more physical resources and/or one or more virtualized resources in the network. As such, the network may react to failures, for example to identify a configuration that would provide an acceptable performance (for example availability) in view of the failure.

The network orchestration methods described herein may be performed in response to a performance metric being or falling below a predetermined threshold. As such, embodiments react to performance degradation. This may, for example, facilitate providing an acceptable level of service.

The network orchestration methods described herein may be performed following one or more upgrades. As such, an impact of the upgrade on performance may be assessed.

The network orchestration methods described herein may be performed continuously, periodically, intermittently and/or at one or more scheduled times. This allows flexibility in how orchestration or optimization is performed. Resource requirements, reactiveness and the importance of maintaining acceptable performance may be considerations in determining when the network orchestration methods are to be performed.

The network orchestration methods described herein may be performed in response to predetermined user input. For example, optimization may be performed when an administrator considers performance is not acceptable.

The network orchestration methods described herein may be used to identify weaknesses in hardware components. For example, it may facilitate pinpointing lower-performing hardware components so that remedial action, for example replacement, repair, and/or upgrading, can take place.

The network orchestration methods described herein may therefore facilitate maintaining service performance above an acceptable level, setting up a new network (a 'start-of-day' scenario) and/or adding a new service or resource into a network.

A discrete optimization algorithm may be run constantly, and changes may be effected by an orchestrator. The discrete optimization algorithm may, for example, seek to optimize availability, capacity, reliability, power consumption, operating cost, capital cost, cooling requirement, time between failures and/or time to recover.

A playbook of changes may be built by considering each failure mode or undesired performance scenario and, on occurrence of such, an approved change may be looked up and effected by the orchestrator. An administrator may therefore review and approve changes in advance of any changes being implemented.

In some examples, a physical resource can be turned off or switched to a low-power mode, for example if availability levels would be sufficient without it.

In some examples, mappings may have different weightings, for example to reflect administrator preferences. For example, a mapping with a lower performance metric than another mapping may still be selected if it is otherwise preferred.

Figure 5:
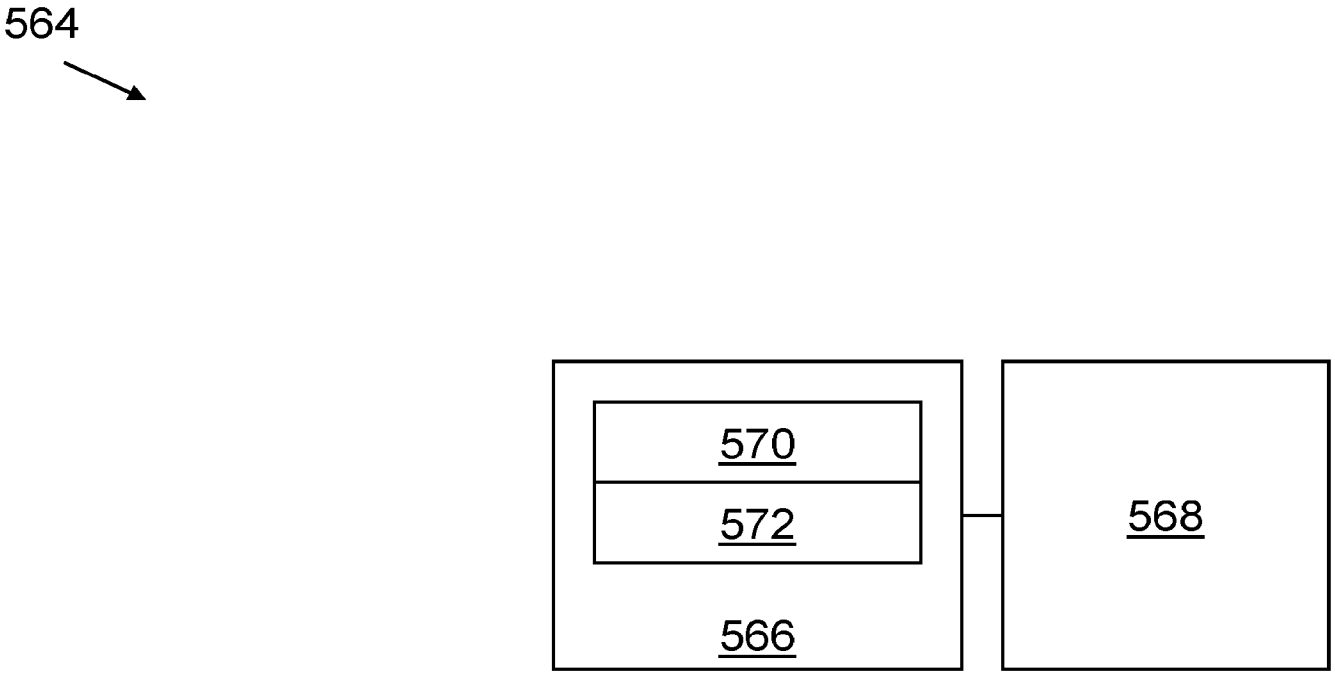
FIG. 5 shows a schematic diagram of an example of a system in accordance with embodiments.

Referring to FIG. 5, there is shown schematically an example of a system 564.

The system 564 comprises a network 566 and an orchestrator 568. The network 566 comprises a virtualized resources part 570 and a physical resources part 572.

The orchestrator 568 may determine a performance metric associated with a mapping of at least one virtualized network resource in the virtualized resources part 570 onto at least one of a plurality of physical resources in the physical resources part 572. The orchestrator 568 may identify a preferred mapping of the at least one virtualized network resource onto a preferred one or more of the plurality of physical resources based at least in part on a comparison of the performance metric with a reference metric. The orchestrator 568 may output a data structure comprising data indicative of the preferred mapping and/or may instantiate the at least one virtualized network resource on the preferred one or more of the plurality of physical resources based at least in part on the identified preferred mapping. Some or all of these acts could alternatively or additional by performed by one or more entities other than the orchestrator 568.

Although, in this example, the orchestrator 568 is depicted as being outside the network 566, in some examples the orchestrator 568 is part of the network 566. The orchestrator 568 may be embodied in hardware and/or software. The orchestrator 568 may be implemented as or via a plug-in to an existing software package. The orchestrator 568 may be implemented via an orchestration platform such as OpenStack Heat™.

The orchestrator 568 may be comprised in or implemented in apparatus comprises a processor or processing system. The processing system may comprise one or more processors and/or memory. Each device, module or function as described in relation to any of the examples described herein may similarly comprise a processor and/or processing system or may be comprised in apparatus comprising a processor and/or processing system. One or more of the aspects of the embodiments described herein with reference to the drawings comprise processes performed by apparatus. In some examples, the apparatus comprises one or more processing systems or processors configured to carry out these processes. In this regard, embodiments may be implemented at least in part by computer software stored in (non-transitory) memory and executable by the processor, or by hardware, or by a combination of tangibly stored software and hardware (and tangibly stored firmware). Embodiments also extend to computer programs, particularly computer programs on or in a carrier, adapted for putting the above described embodiments into practice. The program may be in the form of non-transitory source code, object code, or in any other non-transitory form suitable for use in the implementation of processes according to embodiments. The carrier may be any entity or device capable of carrying the program, such as a RAM, a ROM, or an optical memory device, etc.

Figure 6:
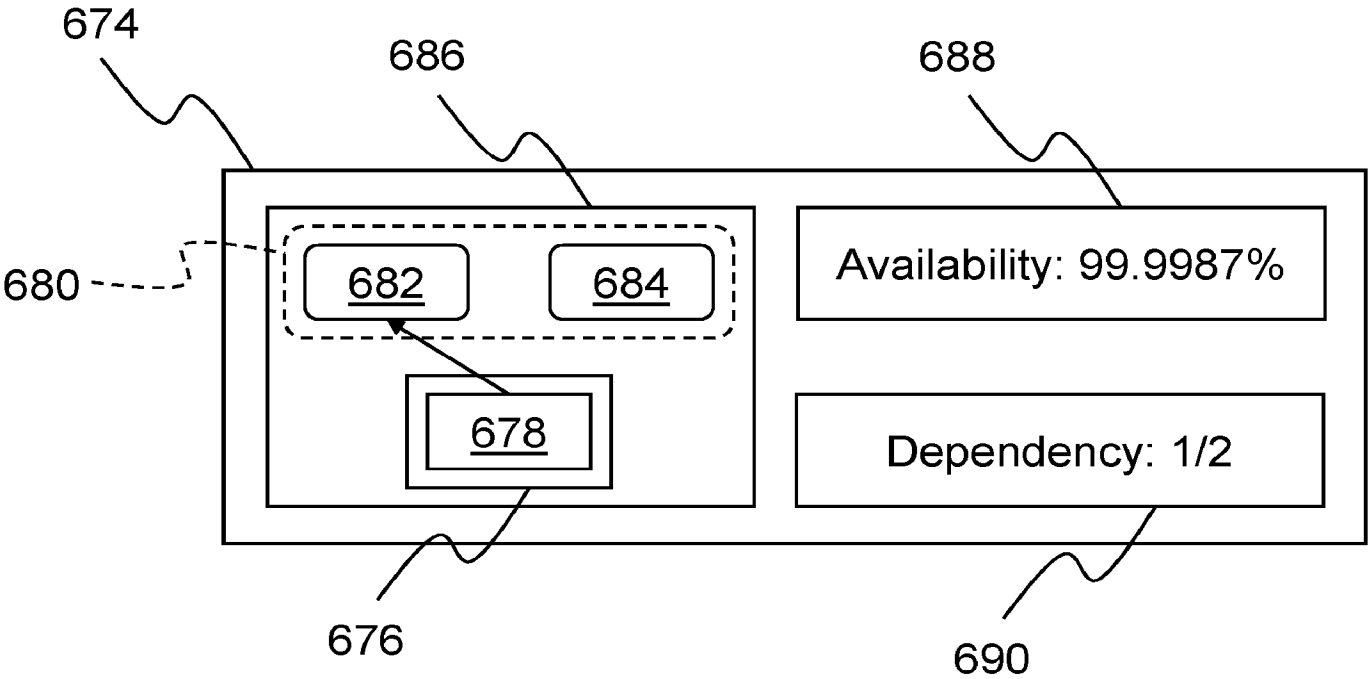
FIG. 6 shows a schematic diagram of an example of a data structure in accordance with embodiments.

Referring to FIG. 6, there is shown schematically an example of a data structure 674.

The data structure 674 is arranged to represent a dependency of one or more network resources in a network comprising a virtualized resources part and a physical resources part. The virtualized resources part 676 comprises at least one virtualized resource 678, as indicated by the node with square edges in FIG. 6. The physical resources part 680 comprises a plurality of physical resources 682, 684, as indicated by the nodes with rounded edges in FIG. 6. The data structure 674 comprises data 686 indicative of one or more mappings of the at least one virtualized resource onto one or more of the plurality of physical resources.

In this example, the data structure 674 comprises performance-related data 688 indicative of one or more performance metrics associated with the one or more mappings. In this example, the data 688 comprises an indication of availability, showing that the mapping depicted in data 686 has an availability of 99.9987%. The data 688 could alternatively or additionally comprise one or more values associated with one or more other performance metrics, for example MTTR and/or MTBF.

In this example, the data structure 674 comprises dependency-related data 690, which comprises, for each node that is dependent on at least one other node, an indication of the number nodes on which it is dependent that are to be available for the dependent node to be available. In this example, the dependency-related data comprises an indication that the virtualized resource (the node with square edges) needs only one out of the two physical resources (the nodes with rounded edges) to be available to operate.

At least one model of the physical resources part of the network may be obtained, at least one model of the virtualized resources part of the network may be obtained and the obtained models may be combined to generate a data structure, such as the data structure 674, comprising a hybrid model of the physical resources part of the network and the virtualized resources part of the network.

Various measures (for example methods, apparatuses, computer programs and computer-readable media) are provided in relation to network orchestration. A model of a physical resources part of a network is obtained. The physical resources part of the network comprises a plurality of physical resources. A model of a virtualized resources part of the network is obtained. The virtualized resources part of the network comprises at least one virtualized network function. A first mapping of the at least one virtualized network function onto at least one of the plurality of physical resources is identified. The at least one virtualized network function is instantiated on the at least one of the plurality of physical resources based on the identified first mapping.

The at least one virtualized network function may be dependent on availability of some or all of the plurality of physical resources.

The network may be represented using a model.

The model may comprise an availability model and/or a dependency model.

The model may represent the virtual resources part of the network using at least one hierarchical level and may represent the physical resources part of the network using at least one additional hierarchical level.

The model may be based on one or more reliability block diagram models and/or one or more Markov models.

The model may be generated by combining the model of the physical resources part of the network and the model of the virtual resources part of the network.

The model may model at least one performance-related variable associated with the at least one virtualized network function and/or at least one performance-related variable associated with some or all of the plurality of physical resources.

The at least one performance-related variable may comprise availability, capacity, power consumption, operating cost, capital cost, cooling requirement, a measure of time between failures and/or a measure of time to recover.

The first mapping may comprise a one-to-one mapping, a one-to-many mapping, a many-to-one mapping, and/or a many-to-many mapping.

The physical resources part of the network may comprise one or more power feeds, one or more power supplies, one or more servers, one or more central processing units and/or one or more air-conditioning supplies.

The virtual resources part of the network may comprise one or more containers, one or more virtual machines, one or more virtualization network function components and/or one or more virtualization network function instances.

The at least one virtualized network function may be mapped onto the at least one of the plurality of physical resources via at least one intermediate virtualized resource. An intermediate virtualized resource may be a virtualized resource that is intermediate at least one physical resource and the at least one virtualized network function in a model of the network. Examples of intermediate virtualized resources include. but are not limited to, containers, VMs, VNFCs and VNFIs.

A first performance metric associated with the first mapping may be determined and the first mapping may be selected based on a comparison of the first performance metric with a first reference metric.

The first performance metric and the first reference metric may relate to availability, capacity, power consumption, operating cost, capital cost, cooling requirement, a measure of time between failures and/or a measure of time to recover.

A second performance metric may be associated with the first mapping. The selecting of the first mapping may be based further on a comparison of the second performance metric with the second reference metric.

The second performance metric and the second reference metric may relate to availability, capacity, power consumption, operating cost, capital cost, cooling requirement, a measure of time between failures and/or a measure of time to recover. A performance metric associated with a second different, mapping of the at least one virtualized network function onto some or all of the plurality of physical resources may be determined.

The first reference metric may be the performance metric associated with the second mapping.

At least part of the method may be performed during network planning, during simulation of operation of the network, prior to adding one or more additional physical resources and/or virtualized resources and/or services to the network, in response to adding one or more additional physical resources and/or virtualized resources and/or services to the network, prior to modifying one or more physical resources and/or virtualized resources and/or services in the network, prior to removing one or more physical resources and/or virtualized resources and/or services from the network, in response to failure of one or more physical resources and/or one or more virtualized resources in the network, in response to a performance metric being below a predetermined threshold, following one or more upgrades, continuously, periodically, intermittently, at one or more scheduled times, and/or in response to predetermined user input.

At least one optimization operation may be performed.

The at least one optimization operation may be based on availability, reliability, processing requirements, capacity, power consumption, operating cost, capital cost, cooling requirement, and/or expandability.

Performing the at least one optimization operation may comprise using a discrete optimization algorithm.

Using the discrete optimization algorithm may comprise using a genetic algorithm and/or using simulated annealing.

Various measures (for example methods, apparatuses, computer programs and computer-readable media) are provided for use in network orchestration. A performance metric associated with a mapping of at least one virtualized network resource in a virtualized resource part of the network onto at least one of a plurality of physical resources in a physical resource part of the network is determined. A preferred mapping of the at least one virtualized network resource onto a preferred one or more of the plurality of physical resources is identified based at least in part on a comparison of the performance metric with a reference metric. A data structure comprising data indicative of the preferred mapping is output.

Various measures (for example methods, apparatuses, computer programs and computer-readable media) are provided for use in network orchestration. A performance metric associated with a mapping of at least one virtualized network resource in a virtualized resources part of the network onto at least one of a plurality of physical resources in a physical resources part of the network is determined. A preferred mapping of the at least one virtualized network resource onto a preferred one or more of the plurality of physical resources is identified based at least in part on a comparison of the performance metric with a reference metric. The at least one virtualized network resource is instantiated on the preferred one or more of the plurality of physical resources based at least in part on the identified preferred mapping.

Various measures (for example methods, apparatuses, computer programs and computer-readable media) are provided for use in network optimization. A preferred one or more of a plurality of hardware components of a network on which to instantiate one or more virtualized network functions is determined based at least in part on a dependency and/or availability model representing at least a dependency and/or availability of the one or more virtualized network functions on some or all of the plurality of hardware components.

Various measures (for example methods, apparatuses, computer programs and computer-readable media) are provided for use in network optimization. At least one model of a physical resources part of a network is obtained. At least one model of a virtualized resources part of the network is obtained. The obtained models are combined to generate a data structure comprising a hybrid model of the physical resources part of the network and the virtualized resources part of the network.

The data structure may comprise data indicative of a mapping of at least one virtualized resource in the virtualized resources part of the network onto at least one physical resource in the physical resources part of the network.

A data structure useable in network orchestration is provided. The data structure is arranged to represent a dependency of one or more virtualized network functions in a network comprising a virtualized network resource part and a physical network resource part. The virtualized network resource part comprises at least one virtualized network resource and the physical network resource part comprises a plurality of physical network resources. The data structure comprises data indicative of one or more mappings of the at least one virtualized network resource onto one or more of the plurality of physical network resources.

The data structure may comprise data indicative of one or more performance metrics associated with the one or more mappings.

The data structure may comprise data indicative of one or more dependencies of one or more of the resources in the network.

A reliability block diagram for use in network orchestration is provided. The reliability block diagram is arranged to represent a dependency of at least one virtualized network function on at least one physical resource in the network.

The reliability block diagram may comprise availability data relating to an availability of the virtualized network function and/or the at least one physical resource.

The above embodiments are to be understood as illustrative examples of the present disclosure. Further embodiments are envisaged.

In examples described above, a mapping between a virtualized resources part of a network and physical resources part of the network is optimized based on availability. Anti-affinity may be used to improve availability, for example by running multiple virtualized resources of the same type on different physical resources for fault tolerance purposes. The mapping may be optimized based on one or more performance-related variables instead of or in addition to availability. An example of such a variable is operating cost, for example relating to the cost of running physical resources in different physical locations and/or relating to the cost of new premises for accommodating additional physical resources and/or relating to acquiring new physical resources. Another example of such a variable is expandability, for example concerning a desire to leave space for future expansion. Another example of such a variable is reliability. Another example of such a variable is capacity. Another example of such a variable is power consumption. Another example of such a variable is cooling requirement, for example cooling capacity and/or costs and/or need to update existing cooling equipment. For example, it may be preferred to use cloud-based resources when a failure or low performance is identified in on-site hardware and/or it may be preferred not to use cloud-based resources when on-site resources are available, for example to control operating costs. Discrete optimization algorithms may take these considerations into account.

Various other factors may alternatively or additionally be taken into account in selecting a mapping. Examples of such other factors include, but are not limited to, whether existing physical resources should be upgraded or replaced.

In examples described above, the model is an RBD. Other availability models could alternatively or additionally be used. Examples of other such availability models include, but are not limited to Markov models. As such, the model used to represent the network may be based on an RBD model and/or a Markov model.

In examples described above, a network comprises a plurality of physical resources and at least one virtualized resource and a mapping of the at least one virtualized resource onto at least one of the plurality of physical resources is identified. In other examples, a network comprises at least one physical resource and at least one virtualized resource and a mapping of the at least one virtualized resource onto the at least one physical resource is identified. Such examples may be used to test whether or not virtualization is desirable, for example by assessing whether or not instantiating a single virtualized resource on a single physical resource would provide an acceptable level of performance.

In some examples described above, optimization is performed. In some examples, a preferred solution may be identified, even if it is not the most preferred solution.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the present disclosure, which is defined in the accompanying claims.

What is claimed is:

1. A method of network orchestration *performed by a computing device*, the method comprising[, by an orchestrator]:

obtaining a model of [a] physical resources [part] of a network[, the physical resources part of the network comprising a plurality of physical resources], the model of the physical resources [part of the network] representing dependencies between [different] *the* physical resources [in the physical resources part of the network];

obtaining a model of [a] virtualised resources part of the network, the virtualised resources [part of the network] comprising at least one virtualised network function, the model of the virtualised resources [part of the network] representing dependencies between different virtualised resources [in the virtualised resources part of the network];

[representing the network using] *generating* a combined model of the network, the combined model of the network combining the model of the physical resources [part of the network] and the model of the virtualised resources [part of the network], wherein the combined model of the network models at least one performance-related variable related to an availability of at least one of the physical resources[, and wherein the availability is determined using a mean time between failures (MTBF) and a mean time to recover (MTTR), and wherein the availability is equal to MTBF/(MTBF+MTTR)] *and at least one of the virtualized resources*;

performing at least one optimisation operation using the combined model to identify an optimised mapping of the at least one virtualised network function onto at least one of the [plurality of] physical resources, the optimised mapping optimising the at least one performance-related variable; and instantiating the at least one virtualised network function on the at least one of the [plurality of] physical resources based on the identified optimised mapping to optimise the at least one performance-related variable.

2. The method of claim 1, wherein the at least one virtualised network function is dependent on availability of some or all of the [plurality of] physical resources.

3. The method of claim 1, wherein the combined model of the network comprises a dependency model.

4. The method of claim 1, wherein the combined model of the network represents the virtual resources [part of the network] using at least one hierarchical level and represents the physical resources [part of the network] using at least one additional hierarchical level.

5. The method of claim 1, wherein the combined model of the network is based on one or more reliability block diagram models [and/or] or one or more Markov models.

6. The method of claim 1, wherein the combined model of the network models at least one performance-related variable associated with the at least one virtualised network function.

7. The method of claim 6, wherein the at least one performance-related variable comprises availability.

8. The method of claim 1, wherein the identified optimised mapping comprises a one-to-one mapping, a one-to-many mapping, a many-to-one mapping, [and/or] *or* a many-to-many mapping.

9. The method of claim 1, wherein the physical resources [part of the network] comprises one or more power feeds, one or more power supplies, one or more servers, one or more central processing units, one or more air-conditioning supplies, one or more network routers, one or more network switches, one or more network cables, Random Access Memory (RAM) [and/or] *or* magnetic storage.

10. The method of claim 1, wherein the virtual resources [part] comprises one or more containers, one or more virtual machines, one or more virtualisation network function components [and/or] *or* one or more virtualisation network function instances.

11. The method of claim 1, wherein the at least one virtualised network function is mapped onto the at least one of the [plurality of] physical resources via at least one intermediate virtualised resource.

12. The method of claim 1, *further* comprising:

determining a first performance metric associated with the identified optimised mapping; and selecting the identified optimised mapping based on a comparison of the first performance metric with a first reference metric.

13. The method of claim 12, wherein the first performance metric and the first reference metric relate to availability, capacity, power consumption, operating cost, capital cost, cooling requirement, a measure of time between failures [and/or] *or* a measure of time to recover.

14. The method of claim 12, *further* comprising determining a second performance metric associated with the identified optimised mapping, wherein said selecting of the first mapping is based further on a comparison of the second performance metric with a second reference metric.

15. The method of claim 14, wherein the second performance metric and the second reference metric relate to availability, capacity, power consumption, operating cost, capital cost, cooling requirement, a measure of time between failures [and/or] *or* a measure of time to recover.

16. The method of claim 12, *further* comprising determining a performance metric associated with a second, different identified optimised mapping of the at least one virtualised network function onto some or all of the [plurality of] physical resources.

17. The method of claim 16, wherein the first reference metric is the performance metric associated with the second mapping.

18. The method of claim 1, wherein at least part of the method is performed:

during network planning;

during simulation of operation of the network;

prior to adding one or more additional physical resources [and/or] *or* virtualised resources [and/or] services to the network;

prior to modifying one or more physical resources [and/or] *or* virtualised resources [and/or] *or* services in the network;

prior to removing one or more physical resources [and/or] *or* virtualised resources [and/or] *or* services from the network;

in response to adding one or more additional physical resources [and/or] *or* virtualised resources [and/or] *or* services to the network;

in response to failure of one or more physical resources [and/or] *or* one or more virtualised resources in the network;

in response to a performance metric being below a predetermined threshold;

following one or more upgrades;

continuously;

periodically;

intermittently;

at one or more scheduled times; [and/or] *or* in response to predetermined user input.

19. The method of claim 1, wherein the at least one optimisation operation is based on availability, reliability, processing requirements, capacity, power consumption, operating cost, cooling requirement, [and/or] *or* expandability.

20. The method of claim 1, wherein performing the at least one optimisation operation comprises using a discrete optimisation algorithm.

21. The method of claim 20, wherein using the discrete optimisation algorithm comprises using a genetic algorithm [and/or] *or* using simulated annealing.

22. [Apparatus] *A system* configured to be used in network orchestration, the [apparatus] *system* comprising at least one memory including computer program code and at least one processor in data communication with the at least one memory, wherein *when the program code is executed by* the at least one processor, *the system* is configured to *perform operations comprising*:

obtain a model of a physical resources part of a network, the physical resources part of the network comprising a plurality of physical resources, the model of the physical resources part of the network representing dependencies between different physical resources in the physical resources part of the network;

obtain a model of a virtualised resources part of the network, the virtualised resources part of the network comprising at least one virtualised network function, the model of the virtualised resources part of the network representing dependencies between different virtualised resources in the virtualised resources part of the network;

[represent the network using] *generate* a combined model of the network, the combined model of the network comprising a combination of the model of the physical resources part of the network and the model of the virtualised resources part of the network, wherein the combined model of the network is arranged to model at least one performance-related variable related to an availability of at least one of the physical resources[, and wherein the processor is configured to determine using a mean time between failures (MTBF) and a mean time to recover (MTTR), and wherein the availability is equal to MTBF/(MTBF+MTTR)] *and at least one of the virtualized resources*;

perform at least one optimisation operation using the combined model to identify an optimised mapping of the at least one virtualised network function onto at least one of the plurality of physical resources, the optimised mapping optimising the at least one performance-related variable; and instantiate the at least one virtualised network function on the at least one of the plurality of physical resources based on the identified optimised mapping to optimise the at least one performance-related variable.

23. A non-transitory computer-readable storage medium comprising computer-executable instructions which, when executed by a processor, cause a computing device to perform [a method of network orchestration, the method comprising, by an orchestrator] *operations comprising*:

[obtaining] *receiving* a model of a physical resources part of a network, the physical resources part of the network comprising a plurality of physical resources, the model of the physical resources part of the network representing dependencies between different physical resources in the physical resources part of the network;

[obtaining] *receiving* a model of a virtualised resources part of the network, the virtualised resources part of the network comprising at least one virtualised network function, the model of the virtualised resources part of the network representing dependencies between different virtualised resources in the virtualised resources part of the network;

[representing the network using] *generating* a combined model of the network, the combined model of the network combining the model of the physical resources part of the network and the model of the virtualised resources part of the network, wherein the combined model of the network models at least one performance-related variable related to an availability of at least one of the physical resources[, and wherein the availability is determined using a mean time between failures (MTBF) and a mean time to recover (MTTR), and wherein the availability is equal to MTBF/(MTBF+MTTR)] *and at least one of the virtualized resources*;

performing at least one optimisation operation using the combined model to identify an optimised mapping of the at least one virtualised network function onto at least one of the plurality of physical resources, the optimised mapping optimising the at least one performance-related variable; and instantiating the at least one virtualised network function on the at least one of the plurality of physical resources based on the identified optimised mapping to optimise the at least one performance-related variable.

* * * * *